(12) United States Patent
Mathew

(10) Patent No.: US 6,592,177 B1
(45) Date of Patent: Jul. 15, 2003

(54) VEHICLE BODY ASSEMBLY

(75) Inventor: Boney A. Mathew, Clarkston, MI (US)

(73) Assignee: Mathson Industries, Inc., Troy, MI (US)

( * ) Notice: Subject to any disclaimer, the term of this patent is extended or adjusted under 35 U.S.C. 154(b) by 0 days.

(21) Appl. No.: 10/194,093

(22) Filed: Jul. 12, 2002

Related U.S. Application Data
(60) Provisional application No. 60/378,084, filed on May 14, 2002, and provisional application No. 60/382,813, filed on May 23, 2002.

(51) Int. Cl.[7] .............................................. B62D 25/06
(52) U.S. Cl. ................... 296/210; 296/216.09; 296/102
(58) Field of Search ............................ 296/210, 216.06, 296/216.07, 216.09, 102

(56) References Cited

U.S. PATENT DOCUMENTS

| | | | |
|---|---|---|---|
| 4,573,733 A | 3/1986 | Zaydel | 296/191 |
| 4,769,655 A | 9/1988 | Nagy et al. | 343/712 |
| 4,840,832 A | 6/1989 | Weinle et al. | 428/156 |
| 4,894,004 A | 1/1990 | Brault | 425/435 |
| 4,945,682 A | 8/1990 | Altman et al. | 49/502 |
| 4,957,326 A | 9/1990 | Chiba et al. | 296/210 |
| 5,000,990 A | 3/1991 | Freeman | 428/36.1 |
| 5,104,178 A | 4/1992 | Bienert | 296/216 |
| 5,120,593 A | 6/1992 | Kurihara | 428/174 |
| 5,230,844 A | 7/1993 | Macaire et al. | 264/46.7 |
| 5,536,060 A | 7/1996 | Rashid et al. | 296/146.6 |
| 5,707,697 A | 1/1998 | Spain et al. | 428/31 |
| 5,741,446 A | 4/1998 | Tahara et al. | 264/1.9 |
| 5,857,732 A | 1/1999 | Ritchie | 296/146.5 |
| 5,916,643 A | 6/1999 | Spain et al. | 428/31 |
| 5,925,207 A | 7/1999 | Itoh et al. | 156/216 |
| 6,151,834 A | 11/2000 | Oami et al. | 49/402 |
| 6,180,211 B1 | 1/2001 | Held | 428/172 |
| 6,196,607 B1 | 3/2001 | Gulisano | 296/39.1 |
| 6,287,678 B1 | 9/2001 | Spengler | 428/297.4 |
| 6,296,044 B1 | 10/2001 | Brooks et al. | 164/80 |
| 6,296,301 B1 | 10/2001 | Schroeder et al. | 296/193 |
| 6,299,244 B1 | 10/2001 | Tarahomi | 296/210 |
| 6,311,882 B1 | 11/2001 | Allison et al. | 224/326 |
| 6,357,819 B1 | 3/2002 | Yoshino | 296/189 |
| 6,367,871 B2 | 4/2002 | Grimm et al. | 296/210 |
| 6,375,254 B1 | 4/2002 | Patz | 296/216.09 |
| 6,390,533 B1 | 5/2002 | Furuse | 296/146.5 |

FOREIGN PATENT DOCUMENTS

| | | | | |
|---|---|---|---|---|
| JP | 63240477 A | * | 10/1988 | 296/210 |
| JP | 403135878 A | * | 6/1991 | 296/210 |

* cited by examiner

*Primary Examiner*—D. Glenn Dayoan
*Assistant Examiner*—Lori L Coletta
(74) *Attorney, Agent, or Firm*—Howard & Howard

(57) ABSTRACT

A vehicle body assembly (10) includes a roof (12) defining an opening having a periphery. The roof (12) has a roof panel (18) having a peripheral edge (20). The vehicle body assembly (10) comprises a clamping mechanism (22) for clamping the edges (20) of the roof panel (18) to the periphery of the opening in sandwiched relationship to one another. The present invention provides several advantages over the prior art patents including an effective and a quick way of fastening a roof panel onto a body of a vehicle. Therefore, the present invention provides another vehicle body assembly that is efficient and easy to use.

23 Claims, 2 Drawing Sheets

VEHICLE BODY ASSEMBLY

This application claims the benefit of provisional applications 60/378,084 filed May 14, 2002 and 60/382,813 filed May 23, 2002.

BACKGROUND OF THE INVENTION

1. Field of the Invention

The subject invention relates to a roof panel for an automotive vehicle, and more particularly to an improvement in the roof panel mounting assembly.

2. Description of the Prior Art

Numerous motor vehicle roof panel mounting arrangements and vehicular roof panel structures are known in the prior art and are widely used in the automotive industry. U.S. Pat. Nos. 4,957,326 to Chiba et al., 6,347,829 to Hanyu, and 6,367,871 to Grimm et al. disclose a variety of roof panel modules and constructions for motor vehicles.

The '326 patent to Chiba et al. shows a roof panel mounting structure wherein the roof panel is fixedly mounted on a vehicle body. The roof panel mounting structure includes a roof rail that forms a part of the vehicle body. Inner and outer panels, joined one with another form a hollow portion therebetween. The roof panel is made of plastic and integrally formed with a boss section projecting downwardly from the roof panel. A mounting bolt is inserted in the boss section and is secured to a reinforcement member to mount the roof panel on the vehicle body.

The '829 patent to Hanyu shows a roof construction for an automotive vehicle. The construction includes a thermoplastic resin roof panel and a roof section of a body frame structure. The roof section has a wall inwardly of its periphery and a support flange extending from a lower end of the wall toward the periphery. The roof panel has an attachment flange on the support flange and is attached to the body frame structure by fastening elements.

The '871 patent to Grimm et al. shows a roof module for a motor vehicle. The roof module includes an inner shell molded out of plastic foam. The inner shell is divided into an upper layer that can be supported on the body framework and a lower layer that serves to line the body framework. To improve and simplify assembly of the roof module on the vehicle body, it is suggested that the upper layer of roof module can be securely fixed to the body framework by fixing screws for sun visors and handholds.

An outsourced or in-house made roof panels and roof modules can save car manufacturers money and can also make the final assembly of automotive vehicles more simpler and cost effective. A variety of the roof panels can be manufactured and installed on the vehicle based on a particular demand of a consumer.

An era of modern technology introduced several ways to solve these problem by providing more efficient and economic methods for making plastic parts used in automotive industry such as plastic roofs, doors, headliners, etc., that can be easily switched from one to another based on consumer particular demand or fancy. However, one of the areas of continuous development and research is the area of more advanced ways to install and assembly parts to a body of a vehicle that is efficient, easy to use and reduces assembly time. Therefore, there is a need in the automotive art for a new, easy to use and install vehicle roof assembly.

BRIEF SUMMARY OF INVENTION

A vehicle body assembly includes a roof defining an opening with a periphery. The roof panel is formed from organic polymeric material and has a peripheral edge. The vehicle body assembly is characterized by a clamping mechanism for clamping the edges of the roof panel to the periphery of the opening in sandwiched relationship to one another.

The present invention provides several advantages over the prior art patents including an effective and a quick way of fastening roof panel onto the body of the vehicle. Therefore, the present invention provides another vehicle body assembly that is efficient, not time consuming and easy to use.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
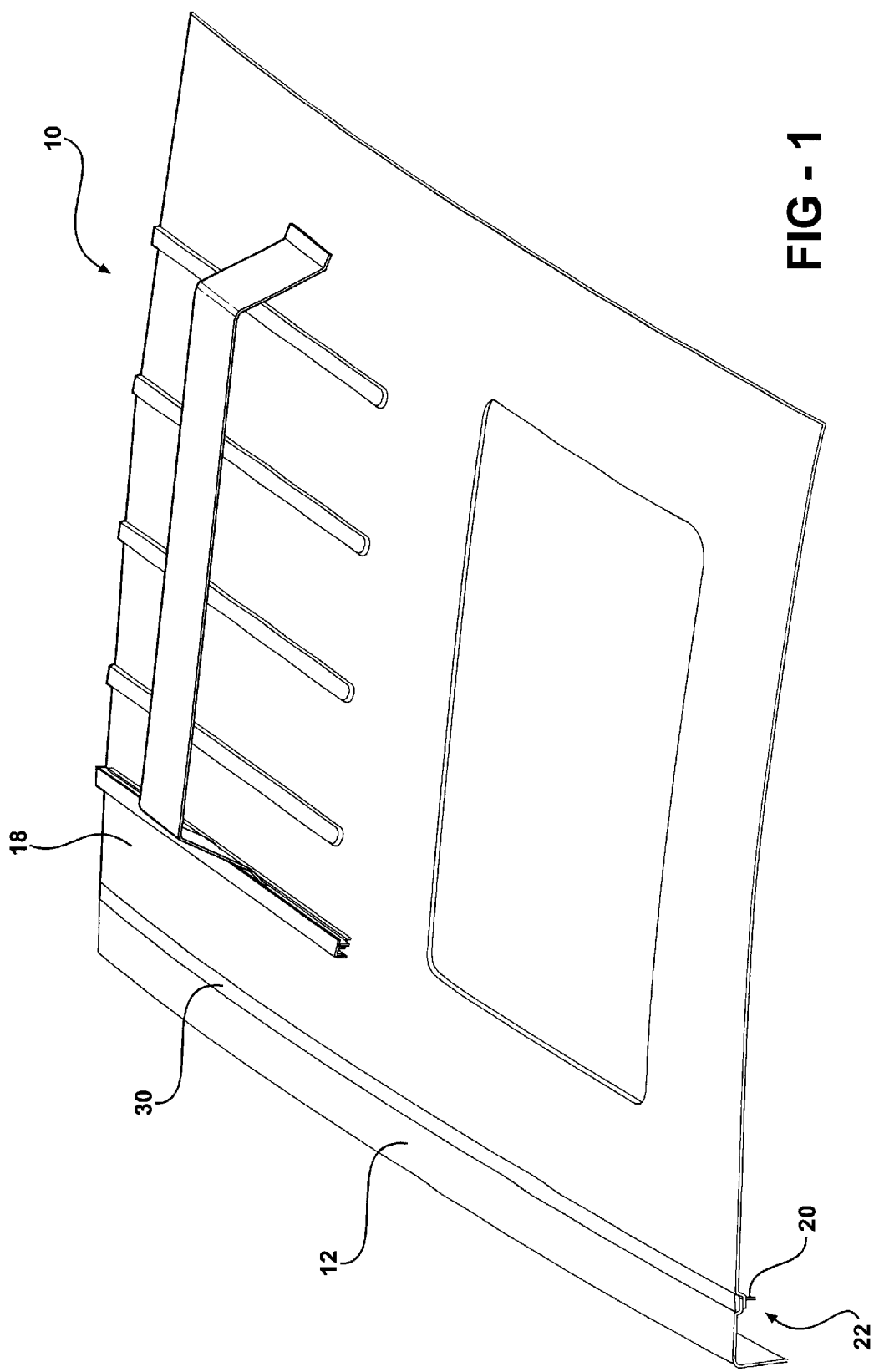
FIG. 1 is a perspective view of the vehicle roof assembly.

Referring to the Figures, wherein like numerals indicate like or corresponding parts throughout the several views, a roof panel and vehicle body assembly for an automotive vehicle is generally shown at 10.

The vehicle body assembly 10 includes a roof 12 that defines an opening having a periphery. The roof 12 includes a roof panel 18 formed from organic polymeric material. The roof panel 18 has a peripheral edge 20. The vehicle body assembly 10 is characterized by a clamping mechanism, generally shown at 22, for clamping the edge 20 of the roof panel 18 to the periphery of the opening in sandwiched relationship to one another.

The periphery of the roof 12 and the roof panel 18 have co-planar upper surfaces wherein the edge 20 and the periphery of the roof 12 are shaped to define a valley, generally shown at 21. The valley 21, defining a hollow, opens downwardly in the embodiment of FIG. 2 and upwardly in the embodiment of FIG. 3. The valley 21 is designed to receive an elongated strip member 24.

The elongated strip member 24 includes a plurality of fasteners, generally shown at 26. The fasteners 26 extend from a bottom portion 28 of the elongated strip member 24 through the edge 20 of the roof panel 18, and the periphery of the roof 12 for clamping the edge 20 and the periphery of the roof 12 between the elongated strip member 24 and fasteners 26. The elongated strip member 24 has an outer surface 30 that is substantially co-planar with a surface of the roof panel 18 and the periphery of the roof 12.

Figure 2:
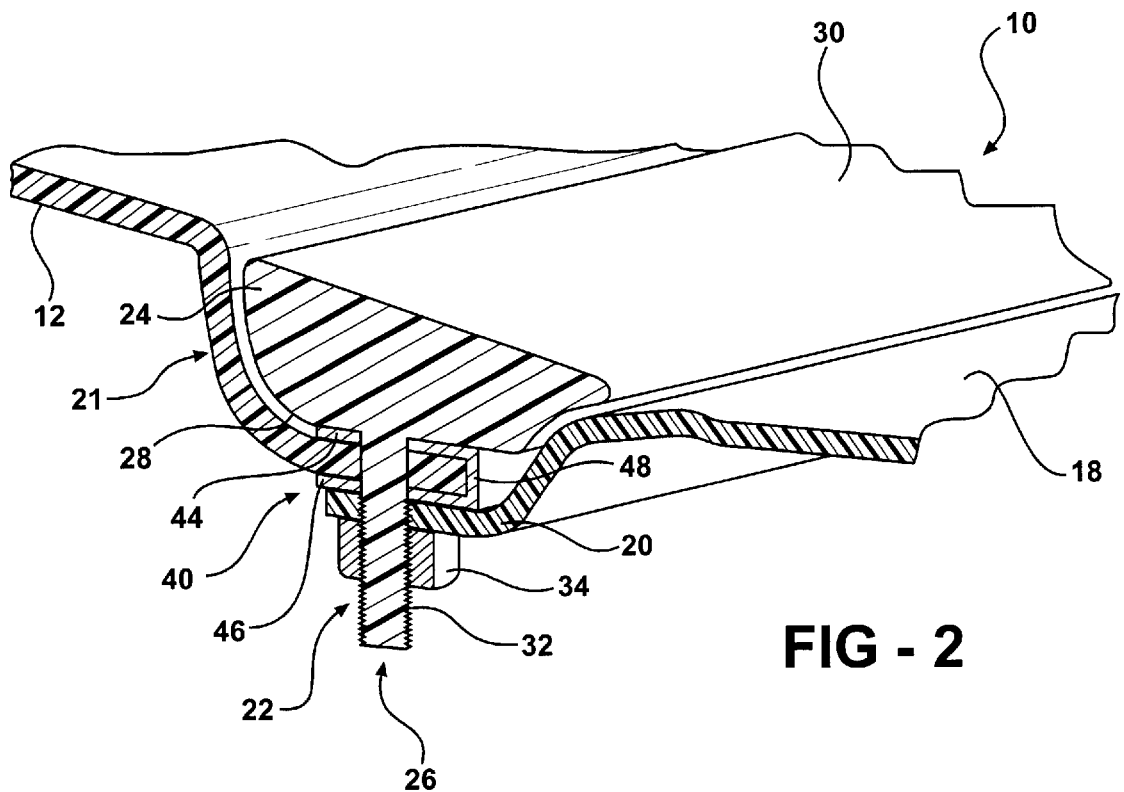
FIG. 2 is perspective cross-sectional view of one embodiment of the vehicle body assembly.

In one embodiment, shown in FIG. 2, the elongated strip member 24 is positioned in the valley 21, and the valley 21 opens upwardly, i.e., to the outside of the body. In this embodiment, each of the fasteners 26 comprise a threaded shaft 32 and a threaded nut 34 wherein the threaded nut 34 threadedly engages the threaded shaft 32. The threaded shaft 32 is integral with the elongated strip member 24.

Figure 3:
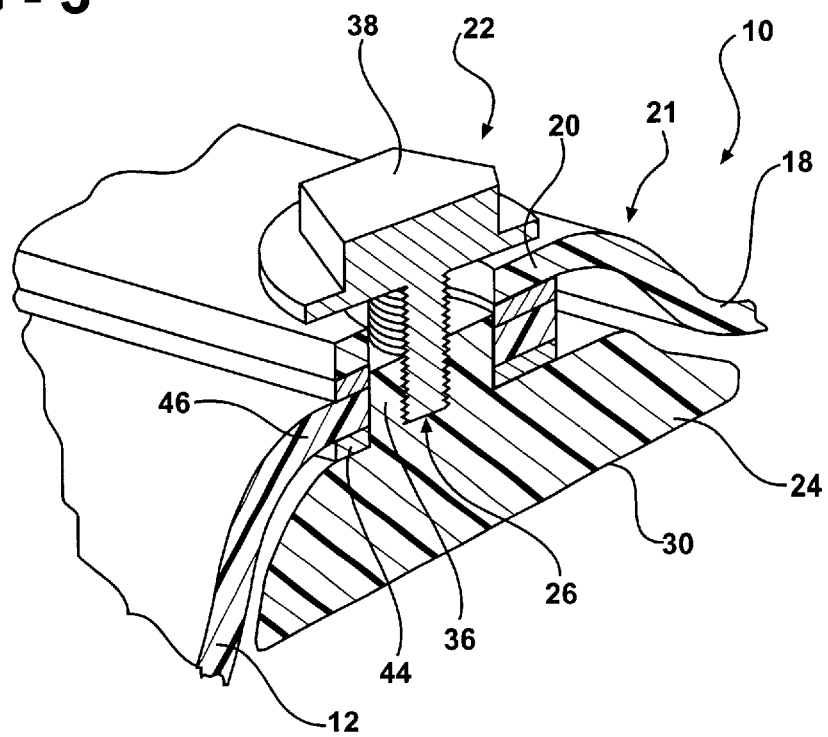
FIG. 3 is a perspective cross-sectional view of the another embodiment of the vehicle body assembly.

In the alternative embodiment, shown in FIG. 3, the elongated strip member 24 is positioned in the valley 21, and the valley 21 opens downwardly, i.e., to the interior of the body. In this embodiment, each of the fasteners 26 includes a threaded base 36, in or extending from the elongated strip member 24 and a threaded bolt 38 having a head and threadedly engaging the threaded base 36.

There are several embodiments of forming the threaded shaft 32, the threaded nut 34, and the threaded base 36. In one embodiment, the threaded shaft 32, the threaded nut 34, and the threaded base 36 comprise organic polymeric material molded into the bottom portion 28 of the elongated strip member 24. In another embodiment the threaded shaft 32, the threaded nut 34, and the threaded base 36 comprise steel and are inserted or molded into the bottom portion 28 of the elongated strip member 24 and extend outwardly therefrom.

The vehicle body assembly 10 includes a seal, generally shown at 40, which is formed from organic polymeric material. The seal 40 includes a first tape 44 and a second tape 46. The first tape 44 is sandwiched between the edge 20 of the roof panel 18 and the periphery of the roof 12. The second tape 46 is sandwiched under the bottom portion 28 of the elongated strip member 24. The first 44 and second 46 tapes are integrally connected with a base 48 that abuts one of the periphery of the roof 12 and the edge 20 of the roof panel 18 as viewed in cross section, i.e., the entire seal is U-shaped. The seal 40 is sandwiched between the edge 20 of the roof panel 18 and the periphery of the roof 12 of the opening for sealing the roof panel 18 with the body of the vehicle.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A vehicle body assembly (10) comprising;
a roof (12) defining an opening having a periphery,
a roof panel (18) of organic polymeric material having a peripheral edge (20),
a clamping mechanism (22) extending along and clamping said edge (20) of said roof panel (18) to said periphery of said opening in sandwiched relationship to one another, and
a seal (40) sandwiched between said edge (20) of said roof panel (18) and said periphery of said opening of said roof (12) for sealing said edge (20) of said roof panel (18) with said periphery of said opening of said roof (12).

2. A vehicle body assembly (10) comprising;
a roof (12) defining an opening having a periphery,
a roof panel (18) of organic polymeric material having a peripheral edge (20),
a clamping mechanism (22) extending along and clamping said edge (20) of said roof panel (18) to said periphery of said opening in sandwiched relationship to one another and including an elongated strip (24) and a plurality of fasteners (26) extending through said edge (20) and said periphery of said opening for clamping said edge (20) and said periphery between said strip (24) and said fasteners (26).

3. An assembly (10) as set forth in claim 2 wherein said periphery of said opening and said panel (18) have co-planar surfaces and said edge (20) and said periphery of said opening are shaped to define a valley (21) below said co-planar surfaces, said strip (24) being disposed in said valley (21).

4. (Amended) An assembly (10) as set forth in claim 3 wherein said strip (24) has an outer surface (30) substantially co-planar with said co-planar surface of said periphery of said opening and said roof panel (18).

5. An assembly (10) as set forth in claim 4 wherein said valley (21) opens upwardly.

6. An assembly (10) as set forth in claim 5 wherein each of said fasteners (26) includes a threaded shaft (32) extending from said strip (24) and a threaded nut (34) threadedly engaging said shaft (32).

7. An assembly (10) as set forth in claim 4 wherein said valley (21) opens downwardly.

8. An assembly (10) as set forth in claim 7 wherein each of said fasteners (26) includes a threaded base (36) in said strip (24) and a threaded bolt (38) threadedly engaging said base (36).

9. An assembly (10) as set forth in claim 4 including a seal (40) sandwiched between said edge (20) and said periphery of said opening.

10. An assembly (10) as set forth in claim 9 wherein said seal (40) includes a first tape (44) sandwiched between said edge (20) and said periphery and a second tape (46) sandwiched under said strip (24).

11. An assembly (10) as set forth in claim 10 wherein said first (44) and second (46) tapes are integrally connected with a base (48) that abuts one of said periphery of said opening and said edge (20) as viewed in cross section.

12. A roof panel assembly (10) for disposition in an opening having a periphery in a vehicle body, said assembly (10) comprising:
a roof panel (18) of organic polymeric material having a peripheral edge (20),
a clamping mechanism (22) for extending along and clamping said edge (20) of said panel (18) in sandwiched relationship to the periphery of the opening, and
a seal (40) for sandwiched disposition between said edge (20) and the periphery of the opening for sealing said edge (20) of said roof panel (18) with said periphery of said opening of said roof (12).

13. A roof panel assembly (10) for disposition in an opening having a periphery in a vehicle body, said assembly (10) comprising:
a roof panel (18) of organic polymeric material having a peripheral edge (20),
a clamping mechanism (22) for extending along and clamping said edge (20) of said roof panel (18) in sandwiched relationship to the periphery of the opening and said mechanism (22) including an elongated strip (24) and a plurality of fasteners (26) extending through said edge (20) for clamping said edge (20) between said strip (24) and said fasteners (26).

14. An assembly (10) as set forth in claim 13 wherein said edge (20) and said periphery of said opening are shaped to define a valley (21) for receiving said strip (24).

15. An assembly (10) as set forth in claim 14 wherein said strip (24) has an outer surface (30) substantially co-planar with said surface of said roof panel (18).

16. An assembly (10) as set forth in claim 15 Wherein said valley (21) opens upwardly.

17. An assembly (10) as set forth in claim 15 wherein each of said fasteners (26) includes a threaded shaft (32) extending from said strip (24) and a threaded nut (34) threadedly engaging said shaft (32).

18. An assembly (10) as set forth in claim 15 wherein said valley (21) opens downwardly.

19. An assembly (10) as set forth in claim 16 wherein each of said fasteners (26) includes a threaded base (36) in said strip (24) and a threaded bolt (38) threadedly engaging said base (36).

20. An assembly (10) as set forth in claim 15 including a seal (40) for sandwiched disposition with said edge (20).

21. An assembly (10) as set forth in claim 20 wherein said seal (40) includes a first tape (44) for sandwiched disposition between said edge (20) and said periphery of said opening and a second tape (46) for sandwiched disposition under said strip (24).

22. An assembly (10) as set forth in claim 21 wherein said first (44) and second (46) tapes are integrally connected with a base (48) for abutting one of said periphery of said opening and said edge (20) as viewed in cross section.

23. An assembly (10) as set forth in claim 13 wherein said strip (24) and said fasteners (26) are integral organic polymeric material.

* * * * *